SNUBBING LOAD APPLYING SPRING

Original Filed July 21, 1961

INVENTOR.
Russell G. Heyl, Jr.
BY
Barnard, McGlynn and Reising
ATTORNEYS

INVENTOR.
Russell G. Heyl, Jr.
BY
Barnard, McGlynn and Reising
ATTORNEYS

March 1, 1966　　　R. G. HEYL, JR　　　3,237,906
SNUBBING LOAD APPLYING SPRING
Original Filed July 21, 1961　　　6 Sheets-Sheet 2

INVENTOR.
BY
ATTORNEYS

March 1, 1966 R. G. HEYL, JR 3,237,906

SNUBBING LOAD APPLYING SPRING

Original Filed July 21, 1961 6 Sheets-Sheet 3

INVENTOR.
Russell G. Heyl, Jr.
BY
Barnard, McGlynn and Reising
ATTORNEYS

March 1, 1966 R. G. HEYL, JR 3,237,906

SNUBBING LOAD APPLYING SPRING

Original Filed July 21, 1961

INVENTOR
Russell G. Heyl, Jr
BY
Barnard, McGlynn and Reising
ATTORNEYS

March 1, 1966 R. G. HEYL, JR 3,237,906

SNUBBING LOAD APPLYING SPRING

Original Filed July 21, 1961

INVENTOR.

Russell G. Heyl, Jr

BY

Barnard, McGlynn and Reising

ATTORNEYS

March 1, 1966 R. G. HEYL, JR 3,237,906

SNUBBING LOAD APPLYING SPRING

Original Filed July 21, 1961 6 Sheets-Sheet 6

INVENTOR.
Russell G. Heyl, Jr.
BY
Barnard, McGlynn and Reising
ATTORNEYS.

United States Patent Office 3,237,906
Patented Mar. 1, 1966

3,237,906

SNUBBING LOAD APPLYING SPRING

Russell G. Heyl, Jr., Birmingham, Mich., assignor to American Metal Products Company, Detroit, Mich., a corporation of Michigan Continuation of application Ser. No. 125,795, July 21, 1961. This application Jan. 29, 1964, Ser. No. 341,053
21 Claims. (Cl. 248—399)

This is a continuation of United States patent application Serial No. 125,795, filed in the United States Patent Office on July 21, 1961, in the name of Russell G. Heyl, Jr., and now abandoned.

This invention relates to spring balancing devices and more particularly to a spring having snubbing characteristics for balancing the weight of a device.

Usually when the springs are employed for balancing a device or supporting a load, such as the springs for supporting an automobile body on the wheel supporting structure thereof, separate snubbers for controlling the action of the spring are utilized to prevent the rebounding of the body after being deflected downwardly.

The present invention pertains to the use of a spiral spring made of flat stock wound in a manner to have the coils, or convolutions, on one side of the spiral in engagement with each other when provided with sufficient strength to support the movable portion of a device. The movable portion of the device will be resiliently maintained by the strength of the spring against substantial downward deflection and, in view of the engagement of the coils on one side of the spring, will function as a snubber for preventing the movable portion of the device from rebounding after deflection. The spring may be adjusted to provide a greater or lesser amount of engagement between the coils so that the amount of snubbing may be varied. Preferred examples of the application of the snubbing type of spiral spring will be hereinafter illustrated and described for a seat which permits a degree of deflection but which prevents the rebounding of the seat thereafter.

Accordingly, the main objects of the invention are: to provide a spiral type spring wound in a manner to have the coil disposed in engagement on one side of the center line to act as a snubber to prevent the supported element from rebounding after being deflected; to provide one or a plurality of spiral springs having portions of the coils in contact relation to each other for resiliently supporting a load and for producing a snubbing action therefor; to provide one or more spiral springs for resiliently mounting a seat, with adjusting means for regulating the amount of engagement of the turns of the springs with each other for regulating the amount of snubbing action produced thereby; and, in general, to provide a spiral spring with snubbing properties which is simple in construction, positive in operation, and economical to manufacture.

Other objects and features of novelty of the invention will be specifically pointed out or will become apparent when referring, for a better understanding of the invention, to the following description taken in conjunction with the accompanying drawings, wherein.

Figure 1:
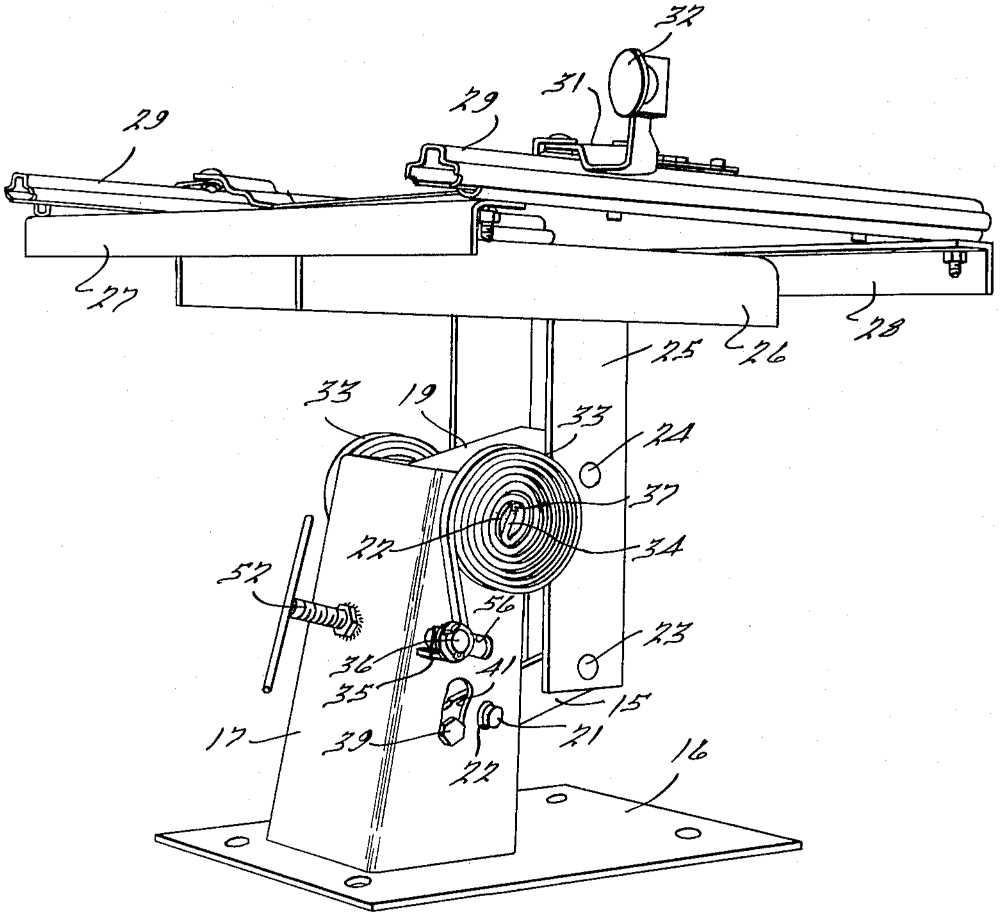
FIGURE 1 is a perspective view of a seat support having spiral springs thereon for balancing the load, so constructed as to have the snubbing properties which embody features of the present invention.
Figure 3:
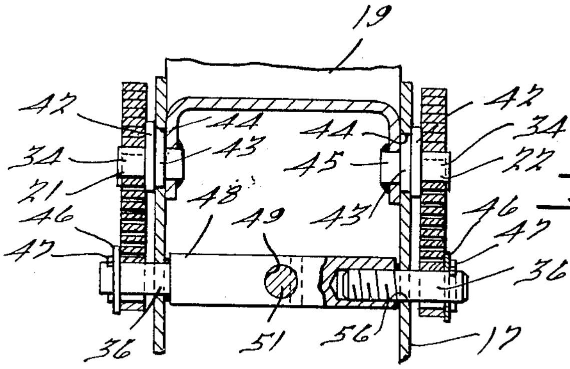
FIGURE 3 is a sectional view of the structure illustrated in FIGURE 2, taken on the line 3—3 thereof.
Figure 2:
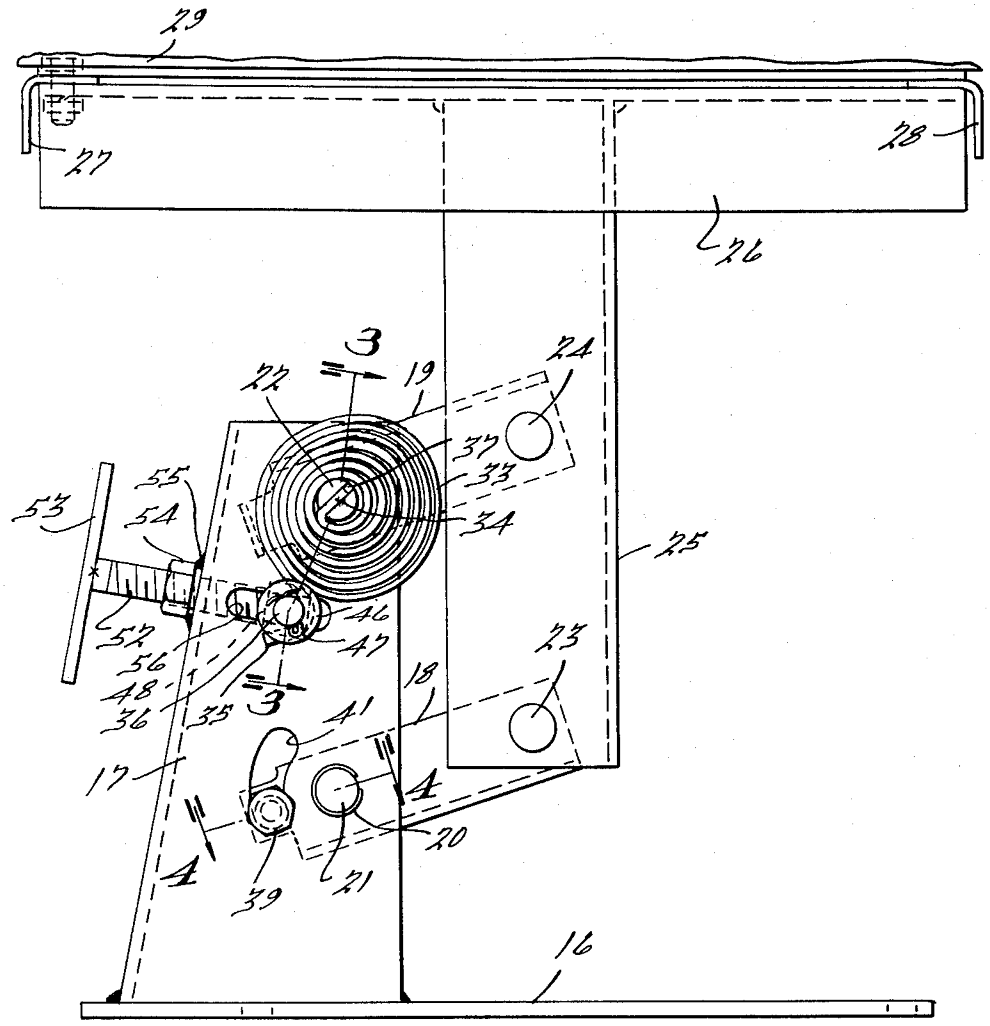
FIGURE 2 is a view in elevation of the structure illustrated in FIGURE 1.
Figure 4:
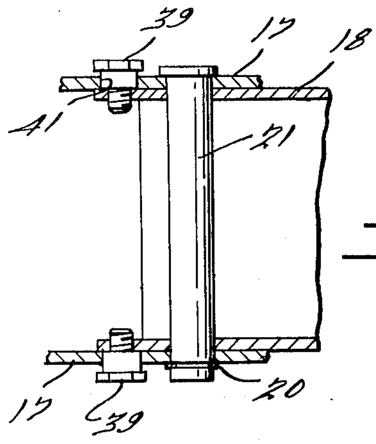
FIGURE 4 is a sectional view of the structure illustrated in FIGURE 2, taken on the line 4—4 thereof.
Figure 5:
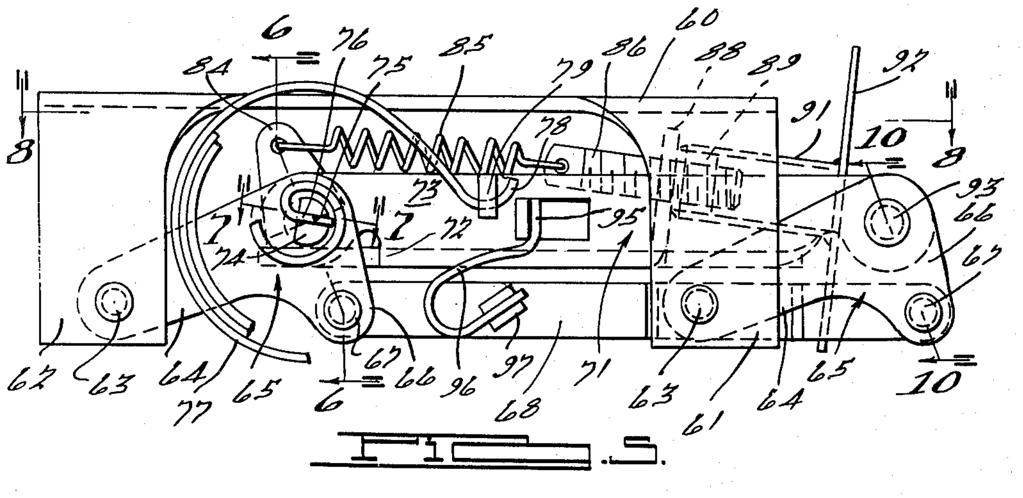
FIGURE 5 is a broken view in elevation of a seat support, similar to that illustrated in FIGURE 1, showing another form which the invention may assume.
Figure 6:
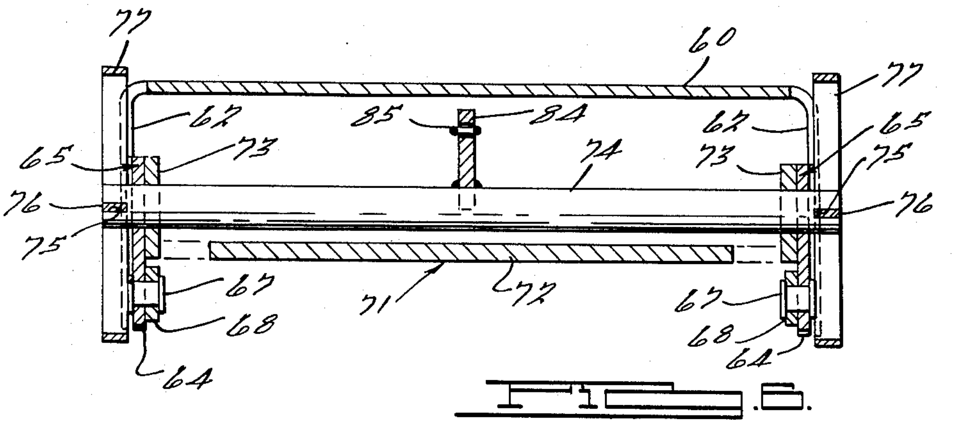
FIGURE 6 is a sectional view of the structure illustrated in FIGURE 5, taken on the line 6—6 thereof.
Figure 7:
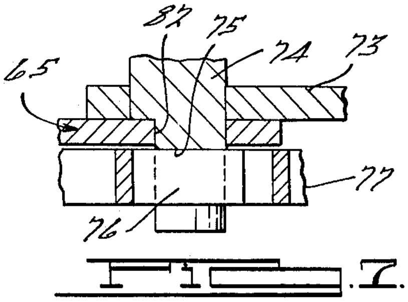
FIGURE 7 is an enlarged sectional view of the structure illustrated in FIGURE 5, taken on the line 7—7 thereof.
Figure 8:
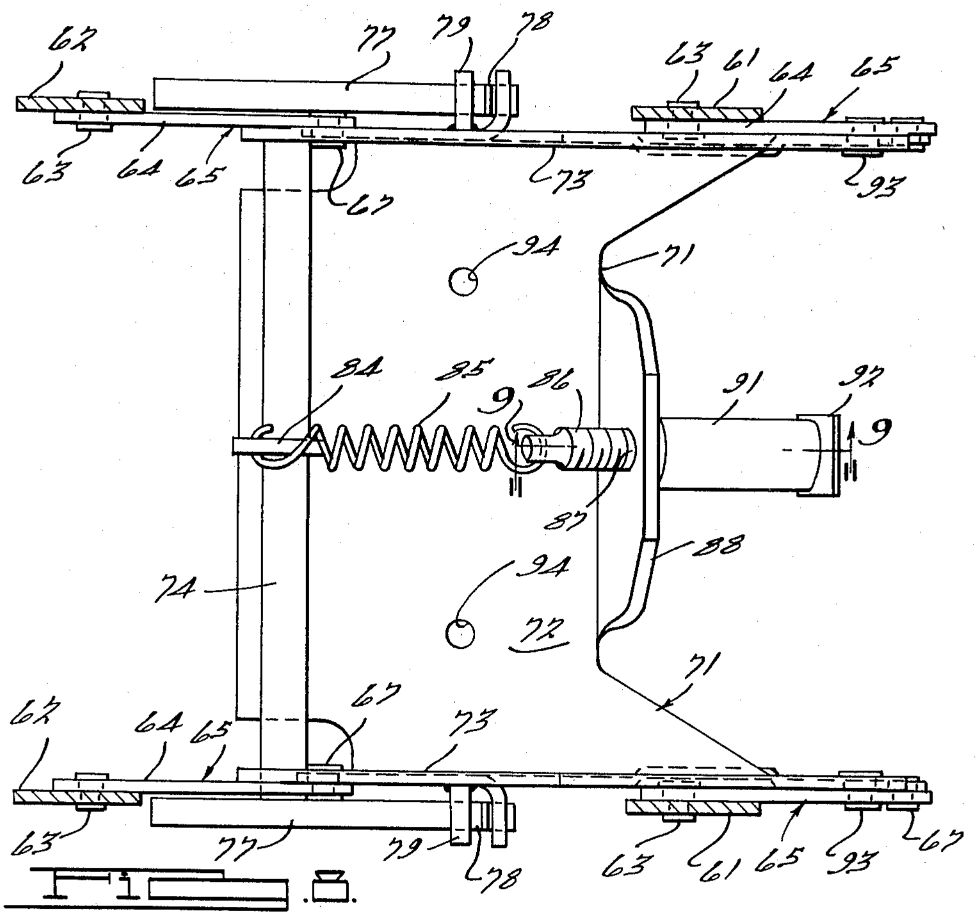
FIGURE 8 is a sectional view of the structure illustrated in FIGURE 5, taken on the line 8—8 thereof.
Figure 9:
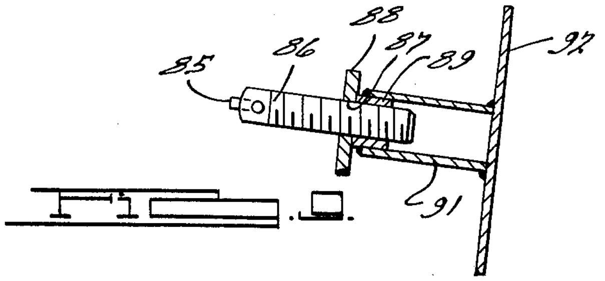
FIGURE 9 is a sectional view of the structure illustrated in FIGURE 8, taken on the line 9—9 thereof.

Referring to FIGURES 1 to 4, the seat support embodies a base plate 16 having a channel-shaped upright 17 thereon on which a pair of channel-shaped arms 18 and 19 are secured. The arm 18 is secured by a pin 21 and a locking ring 20, the arm 19 by a pair of pivots 22. The opposite ends of the channel-shaped arms 18 and 19 are secured by pivots 23 and 24 to a channel-shaped pedestal 25 which is welded or otherwise secured to a downwardly facing channel-shaped element 26. The element 26 has angle-shaped elements 27 and 28 on the ends thereof which support seat tracks 29 for horizontal sliding movement, locked in adjusted position by a latch element 31 of conventional form operated by a handle 32.

A bucket type seat (not illustrated) is supported upon the track members 29, and the seat and occupant are supported by the pedestal on the two arms 18 and 19 for resilient vertical movement by a pair of spiral springs 33 of like construction. The springs 33 are made of strap spring material and spirally wound from a central finger 34 which is disposed diametrically across the inner coil of the spring. The coil is so wound as to have a portion of the turns in engagement with each other for producing a snubbing action, as will be explained hereinafter. The outer end of the outer coil has the end 35 bent at right angle and disposed about the projecting end of a stud 36. The diametrically disposed fingers 34 are secured in a slot 37 at each end of the pivots 22, the pivots being welded or otherwise secured in fixed relation to the channel-shaped arm 19 to move therewith.

The channel-shaped arm 18 has the inner end extended and provided with a stud or bolt 39 which operates in arcuate slot 41 to limit the movement of the arm 18 and therefore the arm 19 and the downward movement of the pedestal 25 along with the seat and its supporting structure. Each of the pivots 22 has a head 42 thereon which abuts the sides of the channel element 17, having a bearing portion 43 which is journaled in an aperture 44 in said sides. Inwardly extending stud portions 45 of the pivots 22 are welded to the side portions of the channel-shaped arm 19 for movement therewith, as pointed out hereinabove. When the arm 19 moves downwardly under the load on the seat, the spring is wound to resist the downward deflection, and in view of the engagement of the turns with each other on the one side of the springs, a snubbing action occurs which prevents the rebounding of the arm 19 and the pedestal 25 after the spring has been wound up due to the downward deflection of the loaded seat.

The ends of the studs 36 have washers 46 thereon which are retained in position by cotter pins 47. The studs 36 are threaded into a cross bar 48 which has a central aperture 49 into which a cylindrical end 51 of a threaded adjustment element 52 extends. The element 52 has a handle 53 in T relation to the end thereof, and the body is threaded into a nut 54 which is secured by a weld 55 to the outer face of the web of the channel-shaped element 17. The studs 36 are disposed in slots 56 in the flanges of the channel-shaped element 17 and are movable therein through the rotation of the adjusting element 52 for winding up or unwinding the spring to apply a greater or lesser tension thereto and a greater or lesser support and snubbing action therefor. Thus, as the tension increases to provide a support for a greater load, a greater snubbing action results due to the greater area of contact occurring between the turns of the spring on one side of the center line thereof. When the tension is reduced, the area of engagement of the turns is also reduced, thereby reducing the snubbing action an amount which conforms to the amount of tension provided to the spring. When the seat is occupied and the arms 18 and 19 are deflected to support the load by the springs 33, any shock causing the further downward movement of the seat and load will tend to wind up the springs and increase the area of engagement between the turns thereof, thereby providing an increased snubbing action which prevents the rebounding of the seat and load after the downward movement.

In FIGURES 5 to 10, a similar arrangement is illustrated for a seat supporting structure for a tractor which has a minimum amount of vertical movement. A seat supporting platform 60 has downwardly extending arms 61 and 62 on each side thereof, secured by a pivot 63 to one arm 64 of bell cranks 65. The opposite arm 66 of the bell cranks is secured by pivots 67 to a link 68 at each side of the platform. An upwardly presenting channel-shaped plate 71 has a central web 72 and upstanding side flanges 73. A rod 74 is journaled at the left-hand end of the side flanges 73 and is rigidly connected to the center of the adjacent bell cranks. The ends of the rod 74 have a slot 75 therein in which the diametrically disposed central end 76 of the spiral springs 77 is secured. The outer angularly disposed end 78 of the spiral springs is hooked under projecting fingers 79 on the adjacent flanges 73. The ends of the rod 74 are of D shape and are secured in a D-shaped aperture 82 in the left-hand bell cranks 65 which are mated therewith so as to be fixed to rotate therewith. The springs 77 provide a torsional bias to the rod 74 and therefore to the bell cranks 65 and to the platform 60 supported thereon. The rod 74 has a lever arm 84 welded on or secured thereto, to which a spring 85 has one of its ends secured. The opposite end of the spring 85 is secured in an aperture in the end of a stud 86 which extends through an aperture 87 in an upwardly projecting flange 88 of the plate 71. The stud is threaded into a nut 89 which is welded in one end of a tube 91, the opposite end being welded in T relation to a strap 92 which forms a handle by which the nut 89 is rotated and the stud 86 adjusted lengthwise in the aperture 87 of the flange 88. By this means, the spring 85 is tensioned to control the position of the lever arm 84 and therefore the rotative position of the rod 74.

Figure 10:
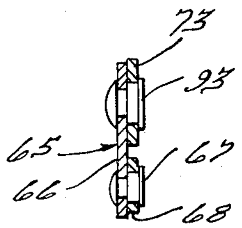
FIGURE 10 is a sectional view of the structure illustrated in FIGURE 5, taken on the line 10—10 thereof.
Figures 11, 12:
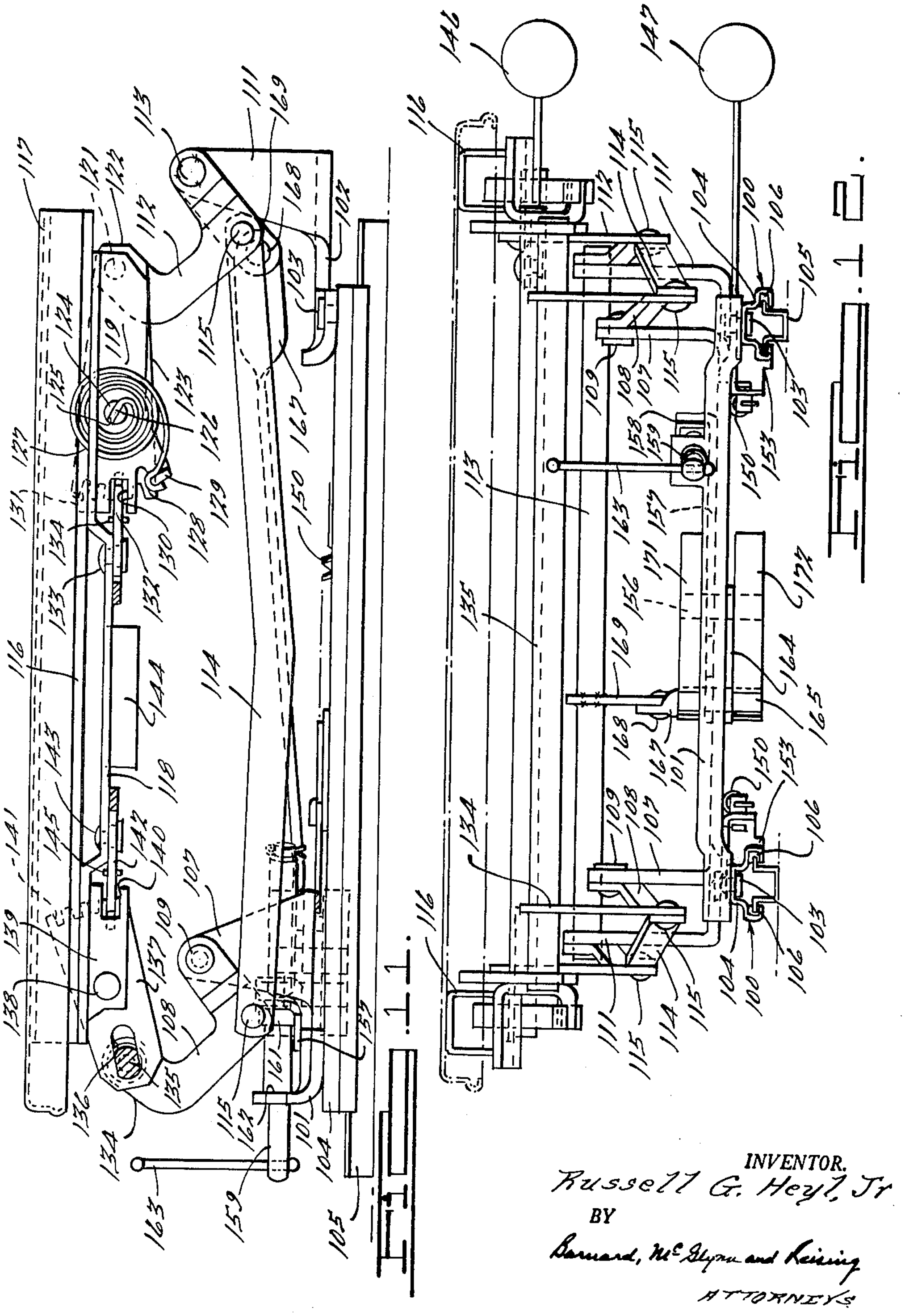
FIGURE 11 is a view of a seat support, similar to that illustrated in FIGURE 5, showing still another form which the invention may assume.
FIGURE 12 is a view of the structure illustrated in FIGURE 11, taken from the left-hand end thereof.
Figure 13:
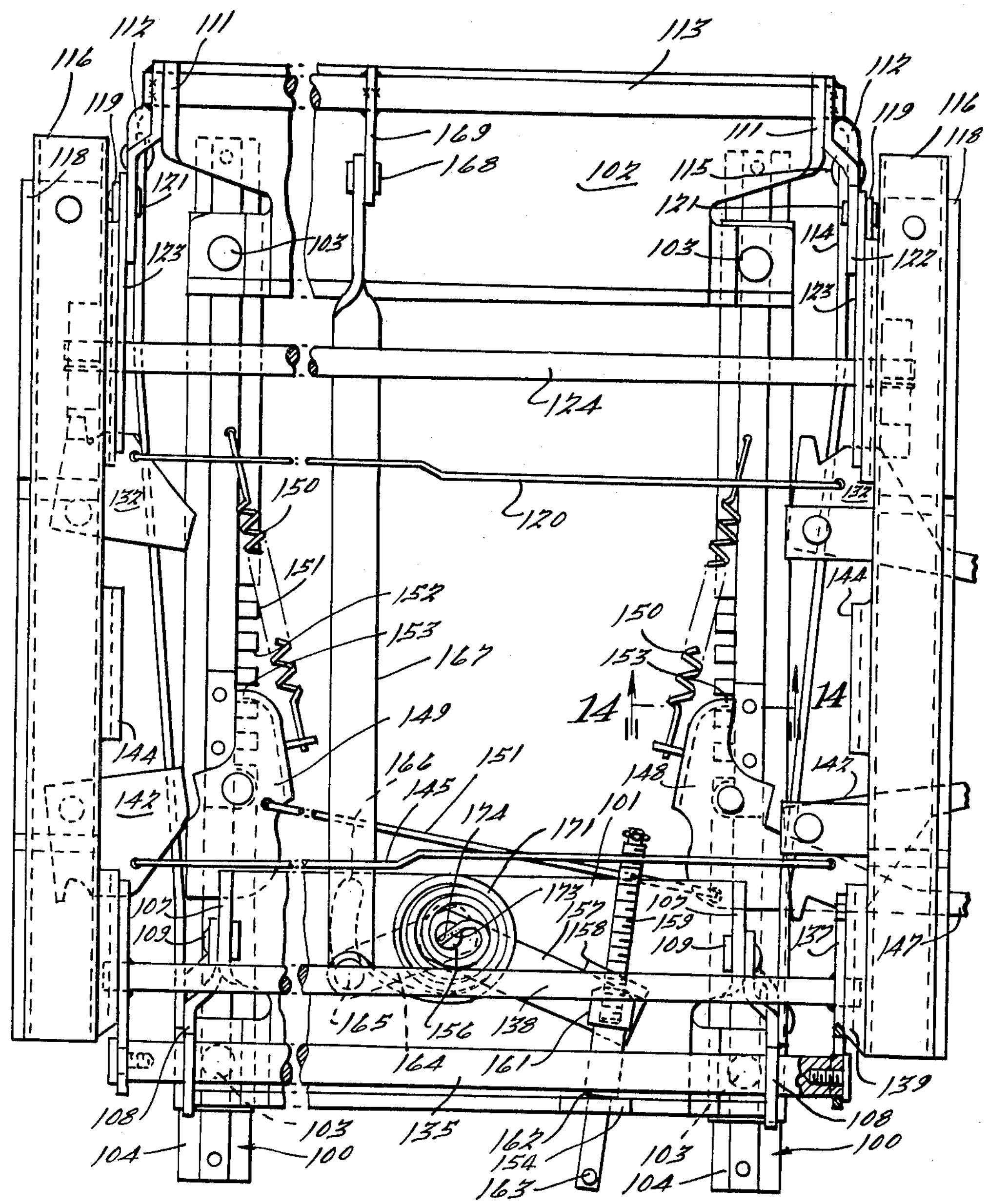
FIGURE 13 is a plan view of the structure illustrated in FIGURE 11.
Figure 14:
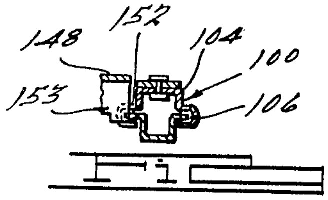
FIGURE 14 is a sectional view of the structure illustrated in FIGURE 13, taken on the line 14—14 thereof.

In FIGURE 10, the bell cranks 65 at the right-hand end of the seat supporting device are secured to the right-hand end of the flanges 73 by headed rivets 93, the same as the rivets 67 which connect the arms 66 of the bell cranks to the links 68.

The web 72 of the plate 71 is secured to a platform in the seating area of the tractor by bolts extending through apertures 94 in the web. The seat is secured to the platform 60 by bolts extending therethrough and when occupied is resiliently supported on the bell crank 65 by the tension in the spiral springs 77 retained in loaded position by the spring 85. The spiral springs 77 are similar to the spiral springs 33 illustrated in FIGURE 1, being made from spring strap material and wound to have the turns of the spring in engagement with each other on one side of a center line through the springs. This produces a snubbing action should the platform 60 attempt to rebound after it is deflected due to driving the tractor over rough terrain. The occupant and the seat move downwardly while supported by the torsional bias of the spiral springs 77 and are prevented from rebounding by the snubbing action produced by the portions of the turns of the springs 77 in engagement with each other. When a greater load is to be supported, the spring 85 is increased in tension to wind the springs 77 a greater amount and thereby increase the engagement between the turns of the springs and produce a greater snubbing action with an increase in load capacity of the platform 60. A pair of springs 96 of flat stock bent into U shape have one end secured in the jaws 97 provided on the links 68. The opposite ends of the spring 96 extend vertically in position to engage the fingers 95 struck from the flanges 73 of the plate 71. The ends of the springs 96 pick up the load of the seat near the end of its downward deflection so as to prevent the supporting structure thereof from striking bottom if overloaded and subjected to maximum shock.

In FIGURES 11 to 14, a further form of seat support is illustrated, that employed for a bucket seat in an automotive vehicle or the like. The seat support has a pair of horizontally movable track elements 100 supporting a front spacer plate 101 and a rear spacer plate 102 which are secured by rivets 103 to the top elements 104 of the pair of track elements 100. The top track elements 104 are supported on the bottom track element 105 by low friction blocks 106 secured therebetween in the conventional manner. The plate 101 has upstanding arms 107 at the front end which extend upwardly above the tracks 100 and to which bell cranks 108 are secured by pivots 109. The plate 102 at the rear of the seat support has upstanding arms 111 to which bell cranks 112 are welded or otherwise secured to the end of a rod 113 which is pivoted in apertures in the upper portion of the arms 111. The pair of bell cranks 108 and 112 at each side of the seat support are secured at the center to links 114 by pivots 115.

Downwardly presenting channel elements 116 form a support for a seat pan 117 and have bracket plates 118 welded or otherwise secured thereto. The bracket plates 118 have downwardly extending flanges 119 at the rear end across which a rod 124 extends in pivotal relation thereto. The upper arms 122 of the bell crank are secured by pivots 121 to the rear ends of links 123 having slots 131 on their opposite ends. The ends of the rod 124 extend through the arms 123 and flanges 119 to project outwardly thereof. Slots 125 in the end of the rod 124 receive the inner diametrically disposed ends 126 of spiral springs 127, the opposite hook end 128 being secured over outwardly extending fingers 129 of the flanges 119. The slots 131 in the forward end of the links 123 form teeth for receiving locking levers 132 secured by rivets 133 to the bracket plates 118 and guided in slots 130 in the flanges 119 at opposite sides of the seat support. A wire 120 interconnects the locking levers 132 at opposite sides of the seat.

The upper end of the arms 134 of the bell cranks 108 at the front end of the seat support is pivoted to a rod 135 which extends across the front of the seat supporting frame. The ends of the rods are flattened and secured within a slot 136 in arms 137 which are welded or otherwise secured to a rod 138 which is journaled in a flange 139 extending downwardly from the channel element 116. One end of the arms 137 has a plurality of slots 141 therein engageable by locking levers 142 which are secured by rivets 143 to the bracket plates 118 in position to operate in a slot 140 of the flange 139. A downwardly extending flange 144 between the locking levers 132 and 142 limits the movement of the locking levers toward each other. A wire 145 extends between the locking levers 142 at each side of the seat supporting structure to cause them to operate in unison. The levers 132 and 142 have an operating knob 146 thereon by which the plates are moved from the slots 131 and 141 to permit the arms 123 and 137 to be adjusted clockwise or counterclockwise for raising or lowering the front or rear end of the seat pan 117. The springs 127 assist the upper movement of the rear portion of the seat when the occupant lifts his body upwardly therefrom.

A locking handle 147 on a locking plate 148 operates a locking plate 149 at the opposite sides of the seat support through an interconnecting wire 151. Any one of a plurality of notches 152 in the inner sides of the track elements 100 is engaged by a flange 153 on the locking plates 148 and 149, urged thereinto by springs 150 attached thereto. When the flanges are moved from the notches by the movement of the handle 147, the seat support on the track elements 104 is moved on the track element 105 to thereby adjust the seat support to different horizontal positions.

The present invention pertains more particularly to the resilient support of the entire seat structure as well as the occupant thereof. The plate 101 has a vertically disposed pivot pin 156 in fixed relation to an arm 157 which is provided with an upstanding flange 158. A threaded stud 159 extends through an aperture in the flange against which a nut 161 on the stud abuts. The stud has a shoulder 162 which engages the flange 154 on plate 101 and a rod 163 through the end by which it is rotated. A second arm 164 is pivoted on the pivot pin 156 below the plate 101. The arm has a stud 165 thereon which extends through a slot 166 in the plate 101. A link 167 is connected to the stud 165, the opposite end being secured by a pivot 168 to an arm 169 fixed to the rod 113. A pair of spiral springs 171 and 172 have the inner diametrically disposed ends 173 secured in slots 174 in the ends of the pivot pin 156. The outer hook ends of the springs 171 and 172 are secured to the ends of the stud 165 to apply a tension on the link 167, arm 169, and a torsional force on the rod 113. The degree of loading of the springs 171 and 172 is regulated by adjusting the position of the arm 157 through the rotational adjustment of the stud 159.

The load on the seat is resiliently supported on the springs 171 and 172 through the rod 113, arm 169, link 167 and stud 165. The springs have a portion of the turns in engagement to produce a snubbing action after the load has been deflected. Since the springs are wound up when the load increases, the area of engagement of the turns increases proportionally and the snubbing action matches the load and deflection as they increase and decrease. The loading of the springs 171 and 172 by the adjustment of the arms 157 also increases the area of engagement of the turns and the snubbing action of the springs.

I claim:

1. In a load supporting structure including a support means and a movable member connected by lever means, a spiral spring secured at one end to said support means and secured at the other end to said lever means to resiliently resist movement of said movable member relative to said support means, said spring having a plurality of adjacent convolutions radially aligned about the center thereof, said springs being disposed so that portions of each of said convolutions in substantially the same area of said spring continuously abuttingly engage a corresponding portion of an adjacent convolution and frictionally resist relative movement between said abutting portions of said convolutions.

2. A load supporting device of the type comprising a base, a movable member, lever means articulating said movable member to said base whereby said movable member is movable relative to said base, and coil spring means including a plurality of radially aligned convolutions, said spring means having ends respectively connected to said lever means and said base to resiliently resist relative movement between said base and said movable member, said coil spring being preloaded under all operating conditions and having said convolutions radially offset in substantially the same area of said spring so that a portion of each convolution continuously abuttingly engages a corresponding portion of a radially adjacent convolution to frictionally resist relative sliding movement between said abutting portions.

3. In a load supporting structure including a support and a movable member connected by lever means, a spiral spring secured at one end to said support and secured at the other end to said lever means to resiliently resist movement of said movable member relative to said support, said spring having a plurality of adjacent convolutions radially aligned about the center thereof, said spring being wound more tightly with movement of said movable member in a loading direction whereby portions of each of said convolutions abuttingly engage a corresponding portion of an adjacent convolution and frictionally resist relative movement between said abutting portions of said convolutions, and adjustment means on said support operably connected to said spring, said adjustment means being operable to vary the force in said spring to change the degree of movement of said movable member relative to said support.

4. In a load supporting structure including a support and a movable member connected by lever means, a spiral spring secured at one end to said support and secured at the other end to said lever means to resiliently resist movement of said movable member relative to said support, said spring having a plurality of adjacent convolutions radially aligned about the center thereof, said spring being wound more tightly with movement of said movable member in a loading direction whereby portions of each of said convolutions abuttingly engage a corresponding portion of an adjacent convolution and frictionally resist relative movement between said abutting portions of said convolutions, and means on said support operably connected to said spring for varying the radial distance between said convolutions to change the degree of movement of said movable member relative to said support.

5. In a load supporting structure, a support, a movable member movable relative to said support, a plurality of link members pivotally connected to said support and said movable member, a spiral spring including a plurality of convolutions and having an inner diametrically disposed end and an outer hook end, a pivot shaft on said support and secured to at least one of said link members for movement therewith, said pivot shaft having a slot in the end thereof for receiving said inner end of said spring, means for engaging said hook end of said spring, movement of said movable member in a loading direction causing rotation of one end of said spring about the center thereof so that portions of each convolution abuttingly engage corresponding portions of adjacent convolutions and frictionally resist relative movement between said abutting portions of said convolutions.

6. The load supporting structure set forth in claim 5 wherein said inner end of said spring rotates with movement of said movable member.

7. The load supporting structure set forth in claim 5 wherein said hook end of said spring shifts with movement of said movable member.

8. The load supporting structure set forth in claim 5 and further including means for adjusting said hook end of said spring for varying the tension in said spring.

9. The load supporting structure set forth in claim 5 wherein said means engaging said hook end of said spring are fixed relative to said support.

10. The load supporting structure set forth in claim 6 and further including a spring secured at one end to said pivot means at the other end to said support, said last named spring being longitudianlly adjustable to rotate said pivot means and vary the tension on said spiral spring.

11. The load supporting structure set forth in claim 5 and further including means for adjusting the outer end of said spring relative to said support for varying the tension on said spring and the degree of movement of said movable member relative to said support.

12. The load supporting structure set forth in claim 5 and further including means for rotatably adjusting said pivot shaft relative to said support for varying the tension in said spring.

13. In a load supporting structure, a base, a movable member movable relative to said base, a pair of arms pivoted to said movable member and said base, load supporting means on said movable member, spiral springs having an inner diametrically disposed end and an outer hook end, a pivot member on the base secured to one of said arms and having a slot in each end for receiving the inner ends of the springs, and a pin on said base for engaging said hook ends, said pin being movable for tensioning said springs and retaining the turns thereof in engaged snubbing relation at one side of said springs.

14. In a load supporting structure, a base, a movable member movable relative to said base, a pair of arms pivoted to said movable member and said base, load supporting means on said movable member, spiral springs having an inner diametrically disposed end and an outer hook end and adjacent convolutions in snubbing contact, a pivot member on said base secured to one of said arms and having a slot in each end for receiving the inner ends of said springs, a pin on said base for engaging said hook ends, and means for moving said pin for adjusting the tension on said springs and the area of snubbing contact between the turns thereof.

15. In a load supporting structure, a base, a movable member movable relative to said base, a pair of arms pivoted to said movable member and said base, load supporting means on said movable member, spiral springs having an inner diametrically disposed end and an outer hook end, a pivot member on said base secured to one of said arms and having a slot in each end for receiving the inner ends of the springs, a pin on said base for engaging said hook ends, means for moving said pin for tensioning said springs and retaining the turns thereof in engaged snubbing relation at one side of said spring, and stop means on one of said arms for limiting the downward movement of said movable member.

16. In a load supporting structure, a base plate having flanges at the sides, a rod pivoted in said flanges at one end thereof and having a diametrically disposed slot in the end, a spiral spring having the inner end thereof diametrically disposed and secured in said slot at the end of said rod, the outer end of said spring being formed into a hook and secured to said flange, an arm on said rod, a spring secured to said arm for applying torsional load to said rod, a load supporting plate movable relative to said base plate and having downwardly extending fingers at the four corners thereof, a bell crank pivoted to said rod, another bell crank pivoted to one of said flanges, an arm on each bell crank pivoted to said extending fingers, and a link interconnecting additional arms of the bell cranks, said spiral spring resiliently resisting movement of said load supporting plate relative to said base plate and having portions of the turns thereof in engaged snubbing relation with portions of adjacent turns thereof to frictionally resist movement between said engaged portions of said turns.

17. In a load supporting structure, a base plate having flanges at the sides, a rod pivoted in said flanges at one end thereof and having a diametrically disposed slot in each end thereof, a pair of spiral springs having the inner ends diametrically disposed and secured in the slots at the ends of the rod, the outer end of said springs being formed into hooks and secured to said flanges, an arm on said rod, a spring secured to said arm for applying torsional load to the rod, a load supporting plate movable relative to said base plate and having downwardly extending fingers at the four corners thereof, a pair of bell cranks pivoted to said rod, another pair of bell cranks pivoted to said flanges, an arm on each bell crank pivoted to said extending fingers, a link interconnecting additional arms of said bell cranks, said spiral spring resiliently resisting movement of said load supporting plate relative to said base plate and having portions of the turns thereof in engaged snubbing relation with portions of adjacent turns thereof to frictionally resist movement between said engaged portions of said turns, a lever arm on said rod, a leaf spring connected to said arm at one end, and adjusting means for supporting the opposite end of said leaf spring to said flanged plate, said leaf spring resiliently supporting said load supporting plate relative to said base plate at the extreme end of movement of said load supporting plate.

18. In a load supporting structure, a frame, a support for said frame movable backwardly and forwardly thereon, a load supporting mechanism, means for connecting said load supporting mechanism to said frame for vertical adjustment, said vertical supporting means embodying a pivoted rod fixed to a bell crank having arms by which said load supporting mechanism is raised or lowered, an arm on said rod, a link on said arm, a stub shaft having a slot in one end, a spiral spring having a plurality of radially aligned turns with a central finger disposed in said slot in said stub shaft, a hook on the opposite end of said spring, and means for connecting said hook to said link for applying a load on said lever arm and said rod, said spiral spring resiliently resisting movement of said load supporting plate relative to said base plate and having portions of the turns thereof in engaged snubbing relation with portions of adjacent turns thereof to frictionally resist movement between said engaged portions of said turns.

19. In a load supporting structure, a frame, a support for said frame movable backwardly and forwardly thereon, a load supporting mechanism, means for connecting said load supporting mechanism to said frame for vertical adjustment, said vertical supporting means embodying a pivoted rod fixed to a bell crank having arms by which said load supporting mechanism is raised or lowered, an arm on said rod, a link on said arm, a stub shaft having a slot in one end, a spiral spring having a plurality of turns with a central finger disposed in the slot of the stub shaft, a hook on the opposite end of said spring, and means for connecting said hook to said link for applying a load on said lever arm and said rod, said hook being offset from said stub shaft toward said link to cause the turns of said spiral spring to be pulled toward the stub shaft on the opposite side of said spring so as to be in frictional snubbing engagement with each other.

20. In a load supporting structure, base supports, bell cranks pivotally mounted on said supports, a link interconnecting said bell cranks on each side of said load supporting structure, supporting elements for said load, links pivoted to said supporting elements and connected at one end to an arm of said bell crank and with the opposite end containing a plurality of slots, latching means extending into said slots for permitting the pivotal adjustment of said links for changing the vertical height of said load supporting elements, a rod fixed to a pair of said bell cranks at opposite sides of said load supporting structure and in fixed relation thereto, an arm on said rod, a link extending from said arm toward the opposite end of said load supporting structure, a platform on said load supporting structure having a stub shaft projecting from the top and bottom thereof and containing a slot in each end thereof, a pair of spiral strap springs having central fingers engageable in said slots and having hooks on the opposite ends thereof, said springs being disposed on opposite sides of said platform, and a pin extending within a slot in said platform and engaging said hooks of said springs and secured to said link pivoted to the arm of said rod for applying a load to said rod, the coils on the spring on the opposite side from that of said hook being disposed in engagement with each other when said springs are under tension to produce a snubbing action to the upward movement of the load supporting elements.

21. In a load supporting structure, base supports, bell cranks pivotally mounted on said supports, a link interconnecting said bell cranks on each side of said load supporting structure, supporting elements for said load, links pivoted to said supporting elements and connected at one end to an arm of said bell crank associated therewith and with the opposite end containing a plurality of slots, latching means extending into said slots for permitting the pivotal adjustment of said links to change the vertical height of said load supporting elements, a rod fixed to a pair of said bell cranks at opposite sides of said load supporting structure and in fixed relation thereto, an arm on said rod, a link extending from said arm toward the opposite end of said load supporting structure, a platform on said load supporting structure having a stub shaft projecting from the top and bottom thereof and containing a slot in each end, a pair of spiral strap springs having central fingers engageable in said slots and having hooks on the opposite ends thereof, said springs being disposed on opposite sides of said platform, a pin extending within a slot in said platform and engaging the hooks of said springs and secured to said link pivoted to the arm of said rod for applying a load to said rod, the coils on each of said springs on the opposite side from that of said hook being disposed in engagement with each other when the springs are under tension to produce a snubbing action to the upward movement of said load supporting elements, and a link secured to said stub shaft by which it is rotatably adjusted to change the torque of the springs.

References Cited by the Examiner

UNITED STATES PATENTS

| | | | |
|---|---|---|---|
| 2,675,578 | 4/1954 | Atwood et al. | 267—1 X |
| 2,757,712 | 9/1956 | Johnson | 248—378 X |
| 2,821,379 | 1/1958 | Donkin et al. | 267—1 |
| 2,924,411 | 2/1960 | Rouverol | 248—54 |

CLAUDE A. LE ROY, *Primary Examiner.*

FRANK L. ABBOTT, *Examiner.*